United States Patent
Koncar et al.

[11] Patent Number: 5,942,347
[45] Date of Patent: Aug. 24, 1999

[54] PROTON EXCHANGE MEMBRANE FUEL CELL SEPARATOR PLATE

[75] Inventors: Gerald J. Koncar, McHenry; Leonard G. Marianowski, Mt. Prospect, both of Ill.

[73] Assignee: Institute of Gas Technology, Des Plaines, Ill.

[21] Appl. No.: 08/859,234

[22] Filed: May 20, 1997

[51] Int. Cl.⁶ ................................................. H01M 2/16
[52] U.S. Cl. ............................................. 429/30; 264/105
[58] Field of Search ................... 264/29.5, 105; 429/30

[56] References Cited

U.S. PATENT DOCUMENTS

| | | |
|---|---|---|
| 3,634,569 | 1/1972 | Emanuelson et al. . |
| 4,175,165 | 11/1979 | Adlhart . |
| 4,301,222 | 11/1981 | Emanuelson et al. . |
| 4,339,322 | 7/1982 | Balko et al. . |
| 4,359,438 | 11/1982 | Hoggins ................................. 264/105 |
| 4,360,485 | 11/1982 | Emanuelson et al. . |
| 4,592,968 | 6/1986 | Taylor . |
| 4,627,944 | 12/1986 | Murakami et al. . |
| 4,652,502 | 3/1987 | Breault et al. . |
| 4,670,300 | 6/1987 | Stewart, Jr. . |
| 4,737,421 | 4/1988 | Uemura et al. . |
| 4,738,872 | 4/1988 | Lee et al. . |
| 4,769,297 | 9/1988 | Reiser et al. . |
| 4,824,741 | 4/1989 | Kunz . |
| 4,826,741 | 5/1989 | Aldhart et al. . |
| 4,826,742 | 5/1989 | Reiser . |
| 5,063,123 | 11/1991 | Ohsuga et al. . |
| 5,108,849 | 4/1992 | Watkins et al. . |
| 5,503,944 | 4/1996 | Meyer et al. . |
| 5,547,777 | 8/1996 | Richards . |

FOREIGN PATENT DOCUMENTS

| | | |
|---|---|---|
| 6068884 | 3/1994 | Japan . |
| 9409520 | 4/1994 | WIPO . |
| 9415377 | 7/1994 | WIPO . |
| 9821774 | 5/1998 | WIPO . |

*Primary Examiner*—Maria Nuzzolillo
*Assistant Examiner*—Monique Wills
*Attorney, Agent, or Firm*—Pauley Petersen Kinne & Fejer

[57] ABSTRACT

A gas impervious bi-polar separator plate for a proton exchange membrane fuel cell having at least one electronically conductive material in an amount in a range of about 50% to about 95% by weight of the separator plate, at least one resin in an amount of at least about 5% by weight of the separator plate, and at least one hydrophilic agent, where the electronically conductive material, the resin, and the hydrophilic agent are substantially uniformly dispersed throughout the separator plate.

55 Claims, 5 Drawing Sheets

PROTON EXCHANGE MEMBRANE FUEL CELL SEPARATOR PLATE

BACKGROUND OF THE INVENTION

1. Field of the Invention

This invention relates to a bi-polar separator plate for use in a proton exchange membrane fuel cell stack. The separator plate is hydrophilic and has a controlled porosity that facilitates in the internal humidification of the fuel cell as well as the removal of product water from the fuel cell, all the while providing means for controlling the temperature of the fuel cell stack.

Generally, fuel cell electrical output units are comprised of a stacked multiplicity of individual cells separated by bi-polar electronically conductive separator plates. Individual cells are sandwiched together and secured into a single staged unit to achieve desired fuel cell energy output. Each individual cell generally includes an anode and cathode electrode, a common electrolyte, and a fuel and oxidant gas source. Both fuel and oxidant gases are introduced through manifolds, either internal or external to the fuel cell stack, to the respective reactant chambers between the separator plate and the electrolyte.

2. Description of Prior Art

There are a number of fuel cell systems currently in existence and/or under development which are designed for use in a variety of applications including power generation, automobiles, and other applications where environmental pollution is to be avoided. These include molten carbonate fuel cells, solid oxide fuel cells, phosphoric acid fuel cells, and proton exchange membrane fuel cells. One issue associated with successful operation of each of these fuel cell types is the control of fuel cell temperature and the removal of products generated by the electrochemical reactions from within the fuel cell.

Commercially viable fuel cell stacks may contain up to about 600 individual fuel cell units, each having a planar area up to 12 square feet. In stacking such individual cells, separator plates separate the individual cells, with fuel and oxidant each being introduced between a set of separator plates, the fuel being introduced between one face of the separator plate and the anode side of an electrolyte and oxidant being introduced between the other face of the separator plate and the cathode side of a second electrolyte. Cell stacks containing 600 cells can be up to 20 feet tall, presenting serious problems with respect to maintaining cell integrity during heat up and operation of the fuel cell stack. Due to thermal gradients between cell assembly and cell operating conditions, differential thermal expansions, and the necessary strength of materials required for the various components, close tolerances and very difficult engineering problems are presented. In this regard, cell temperature control is highly significant and, if it is not accomplished with a minimum temperature gradient, uniform current density will not be maintainable, and degradation of the cell will occur.

In a proton exchange membrane (PEM) fuel cell, the electrolyte is an organic polymer in the form of a proton conducting membrane, such as a perfluorosulfonic acid polymer. This type of fuel cell operates best when the electrolyte membrane is kept moist with water because the membrane will not operate efficiently when it is dry. During operation of the cell, water is dragged through the membrane from the anode side to the cathode side along with proton movement through the membrane. This tends to dry the anode side of the membrane, and also tends to create a water film on the cathode side of the membrane. The cathode surface is further wetted by product water which is formed in the electrochemical reaction. Thus, it is critical to the operation of the PEM fuel cell that the product water be continuously removed from the cathode side of the membrane while maintaining the anode side of the membrane wet to facilitate the electrochemical reaction and membrane conductivity.

The issue of water management in a proton exchange membrane fuel cell is addressed by a number of U.S. patents. U.S. Pat. No. 4,769,297 teaches the use of a solid polymer fuel cell in which water is supplied with the anode gas to the anode side of the membrane. Some of the water migrates through the stack from cell to cell, water migration being the result of water being dragged from the anode through the membrane to the cathode and by the use of a hydrophilic porous separator plate interposed between adjacent cell units. Water is forced through the porous separator plate by means of a reactant pressure differential maintained between the cathode and anode. The anode support plates provide a large surface area from which water is evaporated to perform the cooling function. The separator plate is indicated to be made of graphite.

U.S. Pat. No. 4,824,741 teaches a fuel cell system using a porous graphite anode plate. Water supplied to the porous plate and the anode reactant gas is humidified by evaporation from the surface of the plate. The proton exchange membrane is moistened by contact with the wet porous anode plate. A non-porous gas impervious separator plate adjacent to the cathode plate is used to prevent gas crossover from the anode to the cathode. See also U.S. Pat. No. 4,826,741; U.S. Pat. No. 4,826,742; U.S. Pat. No. 5,503,944; and PCT Application No. WO 94/15377.

Bi-polar separator plates for use in proton exchange membrane cells constructed of graphite or resin-bonded graphite carbon composite materials and having gas flow channels are taught by U.S. Pat. No. 4,175,165. This patent also teaches the treatment of the bi-polar separator plates by coating the surfaces with a wetting agent, such as colloidal silica sols, to render the surfaces thereof hydrophilic. In this way, water generated in the fuel cell is attracted away from the electrodes for subsequent disposition. However, coating the surfaces with a wetting agent undesirably increases the electrical resistance across the plate, resulting in reduced conductivity. U.S. Pat. No. 3,634,569 teaches a method of producing dense graphite plates from a mixture of powder graphite and a thermosetting resin for use in acid fuel cells. The method employs a mixture, by weight, of 5% to 25% thermosetting phenolic resin binder and 75% to 95% sized powdered graphite. Graphite and resin bi-polar plates are also taught by U.S. Pat. No. 4,339,322 (a bi-polar plate comprised of molded thermoplastic fluoropolymer, graphite and carbon fibers), U.S. Pat. No. 4,738,872 (separator plates comprising 50 weight percent graphite and 50 weight percent thermoset phenolic resin), U.S. Pat. No. 5,108,849 (serpentine flow panels in a fuel cell separator plate composed of non-porous graphite or other corrosion resistant metal powders and thermoplastic resin, such as polyvinylidene fluoride, in a composition of 10–30 weight percent resin and 70–90 weight percent graphite powder), U.S. Pat. No. 4,670,300 (a fuel cell plate comprising 20% to 80% graphite with the balance being cellulose fibers or cellulose fibers and thermosetting resin in equal proportions), U.S. Pat. No. 4,592,968 (separator plate comprised of graphite, coke and carbonizable thermosetting phenolic resin which are then graphitized at 2650° C.), U.S. Pat. No. 4,737,421 (fuel cell plate from carbon or graphite in the range of 5% to 45%, thermosetting resin in the range of 40% to 80%, with the balance being cellulose fibers), U.S. Pat. No. 4,627,944 (fuel cell plate from carbon or graphite, thermosetting resin and cellulose fibers), U.S. Pat. No. 4,652,502 (fuel cell plate made from 50% graphite and 50% thermosetting resin), U.S. Pat. No. 4,301,222 (separator plate made from a mixture of 40% to 65% graphite and 35% to 55% resin), and U.S. Pat. No. 4,360,485 (separator plate made from a mixture of 45% to 65% graphite and 35% to 55% resin).

We have found that there are numerous characteristics for a bi-polar separator plate for use in proton exchange membrane fuel cells which are important from a manufacturing, as well as an operational, perspective which are not addressed by the prior art. These include water permeability of the plate relative to electronic conductivity of the plate; crush strength of the plate; functionality of the plate with respect to its ability to maintain its water absorption capabilities; and the ability of the plate to undergo thermocycling between frozen and thawed conditions as are likely to be encountered in, for example, an automobile application of the fuel cell. In addition, the separator plate should be constructable from inexpensive starting materials, materials that are easily formed into any plate configuration, preferably using a one-step molding process, materials that are corrosion resistant in low temperature fuel cells and that do not require further processing such as high temperature thermal treatments, and utilizing a method for producing the plates in which the hydrophilicity and porosity of the plate can be controlled.

SUMMARY OF THE INVENTION

Accordingly, it is one object of this invention to provide a bi-polar separator plate suitable for use in a proton exchange membrane fuel cell which is relatively inexpensive to produce.

It is another object of this invention to provide a bi-polar separator plate having improved properties for removal of water from, and internal humidification of, a proton exchange membrane fuel cell.

It is yet another object of this invention to provide a bi-polar separator plate for a proton exchange membrane fuel cell having a crush strength greater than about 200 psi.

It is yet another object of this invention to provide a bi-polar separator plate for a proton exchange membrane fuel cell which is suitable for use in a fully internally manifolded fuel cell stack.

It is yet another object of this invention to provide a method for producing a bi-polar separator plate suitable for use in a proton exchange membrane fuel cell.

These and other objects of this invention are achieved by a bi-polar separator plate comprising at least one electronically conductive material in an amount in a range of about 50% to 95% by weight of the separator plate, at least one resin in an amount of at least about 5% by weight of the separator plate, and at least one hydrophilic agent suitable for use in a proton exchange membrane fuel cell for attracting water into the separator plate. The electronically conductive material, the resin, and the hydrophilic agent are substantially uniformly dispersed throughout the separator plate. In accordance with one particularly preferred embodiment of this invention, the electronically conductive material is an electronically conductive carbonaceous material and the hydrophilic agent is a hydrophilic resin.

The bi-polar separator plate in accordance with this invention is produced by mixing at least one electronically conductive material, preferably a carbonaceous material, at least one resin, and at least one hydrophilic agent to form a substantially homogeneous mixture comprising the electronically conductive material in an amount in a range of about 50% to 95% by weight of the mixture, at least one resin in an amount of at least about 5% by weight of the mixture, and said at least one hydrophilic agent. The mixture is then molded into a desired shape at a temperature in a range of about 250° F. to 800° F., which temperature is a function of the resin used, and a pressure in a range of about 500 psi to 4,000 psi, resulting in formation of the bi-polar plate. The bi-polar separator plate produced in accordance with this method has a porosity in a range of about 0% to about 25% of the volume of the plate and preferably forms a plurality of pores having a median pore size in a range of about 0.25 microns to about 2.0 microns.

BRIEF DESCRIPTION OF THE DRAWINGS

These and other objects and features of the said invention will be better understood from the following detailed description taken in conjunction with the drawings wherein.

DESCRIPTION OF PREFERRED EMBODIMENTS

This invention is a gas impervious bi-polar separator plate for a proton exchange membrane fuel cell comprising at least one electronically conductive material, at least one resin, and at least one hydrophilic agent, wherein the electronically conductive material, the resin, and the hydrophilic agent are substantially uniformly dispersed throughout the separator plate. The bi-polar separator plate of this invention eliminates the need for external humidification of proton exchange membrane fuel cells and provides thermal management and product water removal in the fuel cell stack system. The preferred composition of the bi-polar separator plate of this invention comprises a graphitic and resin mixture that, when molded under mild conditions of pressure and temperature, yields a conductive, light weight bi-polar plate suitable for use in low temperature electrochemical systems such as proton exchange membrane fuel cells.

The plate may be produced with passages for flow of the reactant fluids for the desired electrochemical system. The plate may be produced with various degrees of conductivity for use in a desired electrochemical system. The plate may be produced with various degrees of porosity for water management of the electrochemical systems. And, finally, the plate may be produced with various degrees of hydrophilicity for use in the water and thermal management of the electrochemical systems.

In accordance with a particularly preferred embodiment of this invention, the bi-polar separator plate comprises at least one electronically conductive material in an amount in a range of about 50% to about 95% by weight of the separator plate, at least one resin in an amount of at least about 5% by weight of the separator plate, and at least one hydrophilic agent. In accordance with a particularly preferred embodiment of this invention, the separator plate is formed from a composition comprising a mixture of about 50 to 95 weight percent graphitic material, graphite, about 5 to about 30 weight percent of a type of thermosetting resin, 0 to about 45 weight percent carbon fibers, and 0 to about 25 weight percent silica. This composition is then molded at an elevated temperature in a range of about 250° F. to about 800° F. and a pressure in a range of about 500 psi to about 4,000 psi. The conductivity of the molded material produced in this fashion is at least about 5 S/cm which represents the nominal minimum conductivity required for use in a proton exchange membrane fuel cell. The porosity of the molded material may be up to about 25% void volume. The bubble pressure of the molded material which increases with decreases in void volume of the plate is at least about 5 psig.

As previously stated, proton exchange membrane fuel cells which employ solid polymer electrolyte membranes operate best when the electrolyte membrane is maintained moist with water. During operation of proton exchange membrane fuel cells, water is dragged through the membrane from the anode side to the cathode side along with proton movement through the membrane. This phenomenon tends to dry the anode side of the membrane, all the while creating water droplets on the cathode facing surface of the membrane. The cathode facing surface is further wetted by product water which is formed in the electrochemical reaction and which appears on the cathode facing surface. Unless properly managed, the water at the cathode facing surface, particularly if in droplet form, may clog the oxidant channels, thereby inhibiting access of oxidant gas to the catalyst and reducing the electrochemical reaction.

Accordingly, it is important that water be supplied to the anode side of the membrane in the fuel cell to prevent drying and that water be continuously removed from the cathode side to prevent water droplets from forming on the membrane surface. Thus, the separator plate of this invention must have sufficient hydrophilicity not only to prevent the accumulation of water on the cathode side, but also to promote the distribution of water throughout the separator plate. By the presence of water throughout the separator plate, the potential for mixing of the reactant gases across the separator plate is substantially reduced. Accordingly, the bipolar separator plate of this invention comprises at least one hydrophilic agent substantially uniformly dispersed throughout the plate suitable for use in a proton exchange membrane cell for attracting water into the separator plate. In accordance with one preferred embodiment of this invention, the at least one resin of the separator plate is hydrophilic. In accordance with a particularly preferred embodiment of this invention, the hydrophilic resin is a phenolic-formaldehyde thermoset resin.

In accordance with another embodiment of this invention, the at least one hydrophilic agent is a wetting agent, preferably selected from the group consisting of oxides of Ti, Al, Si, and mixtures thereof. By virtue of dispersion of the hydrophilic agent throughout the separator plate, the separator plate of this invention has sufficient permeability to water to remove at least about 5.5 cc per minute of product water at a current density of 1,000 amps per square foot at a pressure differential of less than about 10 psi.

One application of the proton exchange membrane fuel cell is for power generation in an automobile. In this application, the fuel cell is exposed to a broad range of temperatures and may undergo numerous freeze/thaw cycles during its lifetime. One would expect that the retention of water within the separator plate as a result of absorption of water by the plate due to the dispersion of hydrophilic agent throughout the plate would result in fracturing of the plate after cycling between frozen and thawed temperature conditions. Surprisingly, the bi-polar separator plate of this invention, with a water absorption of 18 weight percent, exhibited no fracturing after undergoing 12 freeze/thaw cycles.

U.S. Pat. No. 4,175,165 teaches the use of various wetting agents such as colloidal silica sols or high surface area alumina or alumina-silica compositions which are deposited onto the surfaces of the separator plates disclosed therein. However, alumina and silica, as well as other wetting agents, are generally electrical insulators. Thus, application of the wetting agents to the surface of the separator plates renders the surface hydrophilic, but also increases the surface contact resistance of the plates, thereby increasing internal resistance of the cell units which, in turn, decreases cell power.

Surprisingly, the separator plate of this invention employs a wetting agent which is uniformly dispersed throughout the separator plate yet still is able to maintain sufficient electrical conductivity. In accordance with one preferred embodiment, the wetting agent is added as a fine particulate to the mixture of electronically conductive material and resin and intimately mixed therewith to produce a uniform dispersion of the wetting agent. However, it may also be added as a dispersed solution which, when thoroughly mixed with the electronically conductive material and resin, yields the same uniformly mixed molding composite. We believe that the wetting agent promotes the formation of pores in the molded product by preventing the resin and other components from forming one continuous phase. The affinity of these wetting agents to water reduces the surface tension between the water and the molded product. As a result, water in contact with the molded plate has a tendency to form a film on the surface of the molded plate rather than form droplets. Because the molded plate may contain pores, these pores become filled with water easier due to the hydrophilic nature of the plate. If sufficient pressure differential is applied across the plate, water can be transported from one face of the plate to the other face of the plate. Another issue addressed by the separator plate of this invention is plate stability. We have found that the plate of this invention retains 99% of its original weight after more than 1,200 hours in 90° C. water. During this period, the water absorption of the plate also remained constant at 18 weight percent.

Figure 2:
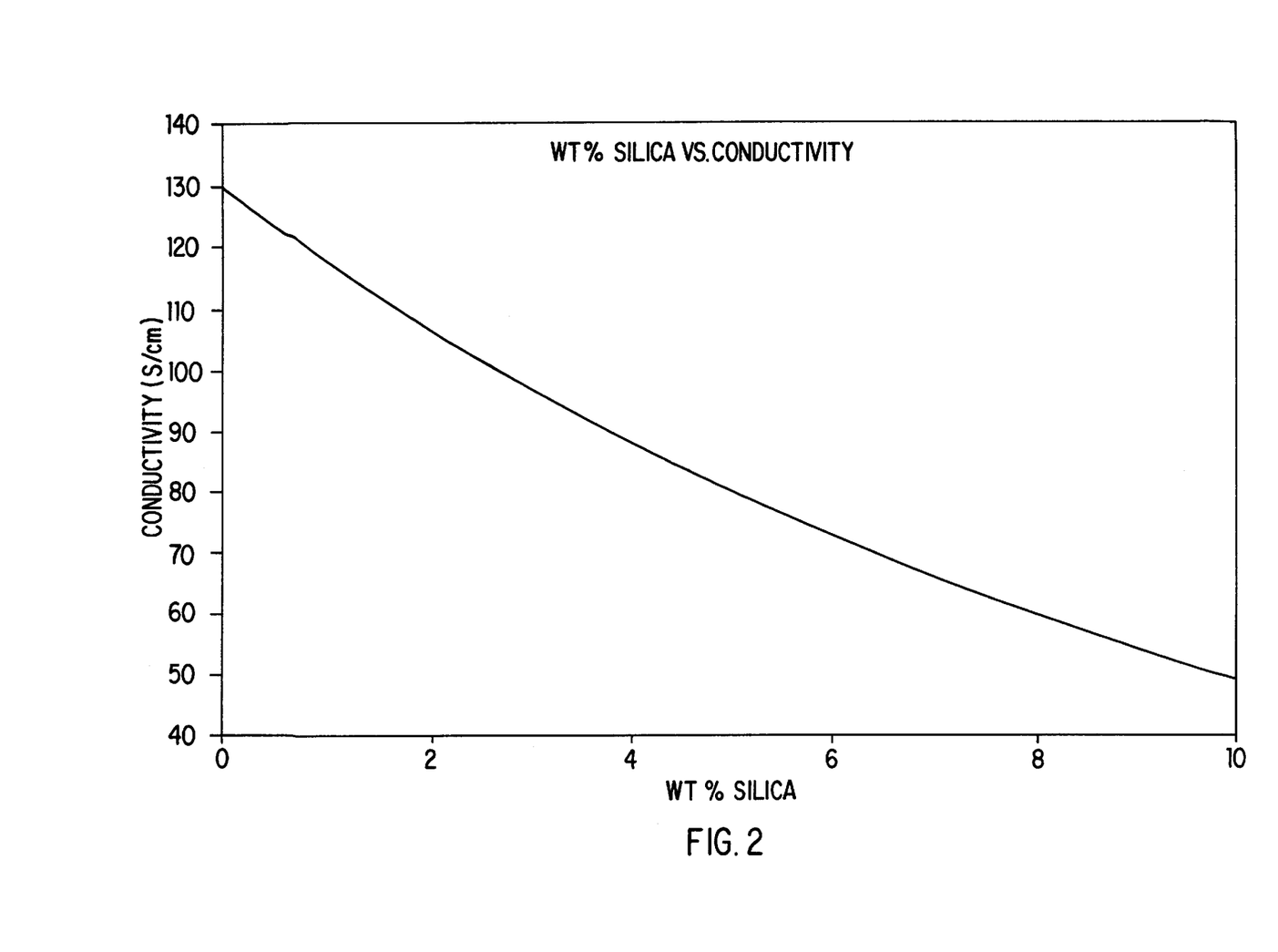
FIG. 2 is a graphical representation of the relationship of the percent of silica as a wetting agent in the separator plate versus the conductivity of the separator plate.

The conductivity of the separator plate of this invention as a function of silica content is shown in FIG. 2, wherein a variety of plates were manufactured with different amounts of silica evenly dispersed therethrough. The separator plates from which these data were derived comprised a thermoset resin in an amount of about 12.5% by weight of the separator plate, silica in an amount between 0% and 10% by weight of the separator plate, and graphite in an amount between about 77.5% to 87.5% by weight of the separator plate.

Separator plates suitable for use in proton exchange membrane fuel cells should have an electrical conductivity not less than about 5 S/cm and preferably not less than about 75 S/cm. The plates of this invention may be porous or nonporous, but in any case must be nonpermeable to gas. In accordance with a particularly preferred embodiment of this invention, the plates are porous, having a porosity less than about 25% by volume. Pore diameters of the separator plate in accordance with this invention are preferably in a range of about 0.25 microns to about 2 microns, with a median pore diameter preferably in the range of about 0.5 microns to about 1.5 microns.

In addition to a hydrophilic agent, the separator plate of this invention comprises at least one electronically conductive material and at least one resin, the electronically conductive material being present in an amount of about 50% to about 95% by weight of the separator plate and the at least one resin being present in an amount of at least about 5% by weight of the separator plate. Suitable electronically conductive materials for use in the separator plate of this invention are selected from the group consisting of carbonaceous materials, metals, metal alloys, metal carbides, metal nitrides, and mixtures thereof. Suitable metals include titanium, niobium, tantalum, and alloys such as hastalloy. In accordance with a particularly preferred embodiment of this invention, the electronically conductive material is a carbonaceous material selected from the group consisting of graphite, carbon black, carbon fibers, and mixtures thereof. Graphite, or various available electrically conductive carbon compounds, such as electrically conductive carbon blacks, are particularly preferred. The use of carbon-based materials reduces the costs associated with fabrication as well as simplifies the fabrication of gas flow control means, such as channels in the plates, and molding of the plates.

In accordance with one preferred embodiment of this invention, the separator plate comprises up to about 10% by weight carbon fibers. The addition of carbon fibers not only strengthens the plate, but also promotes water absorption and conductivity by the plate.

Figure 3:
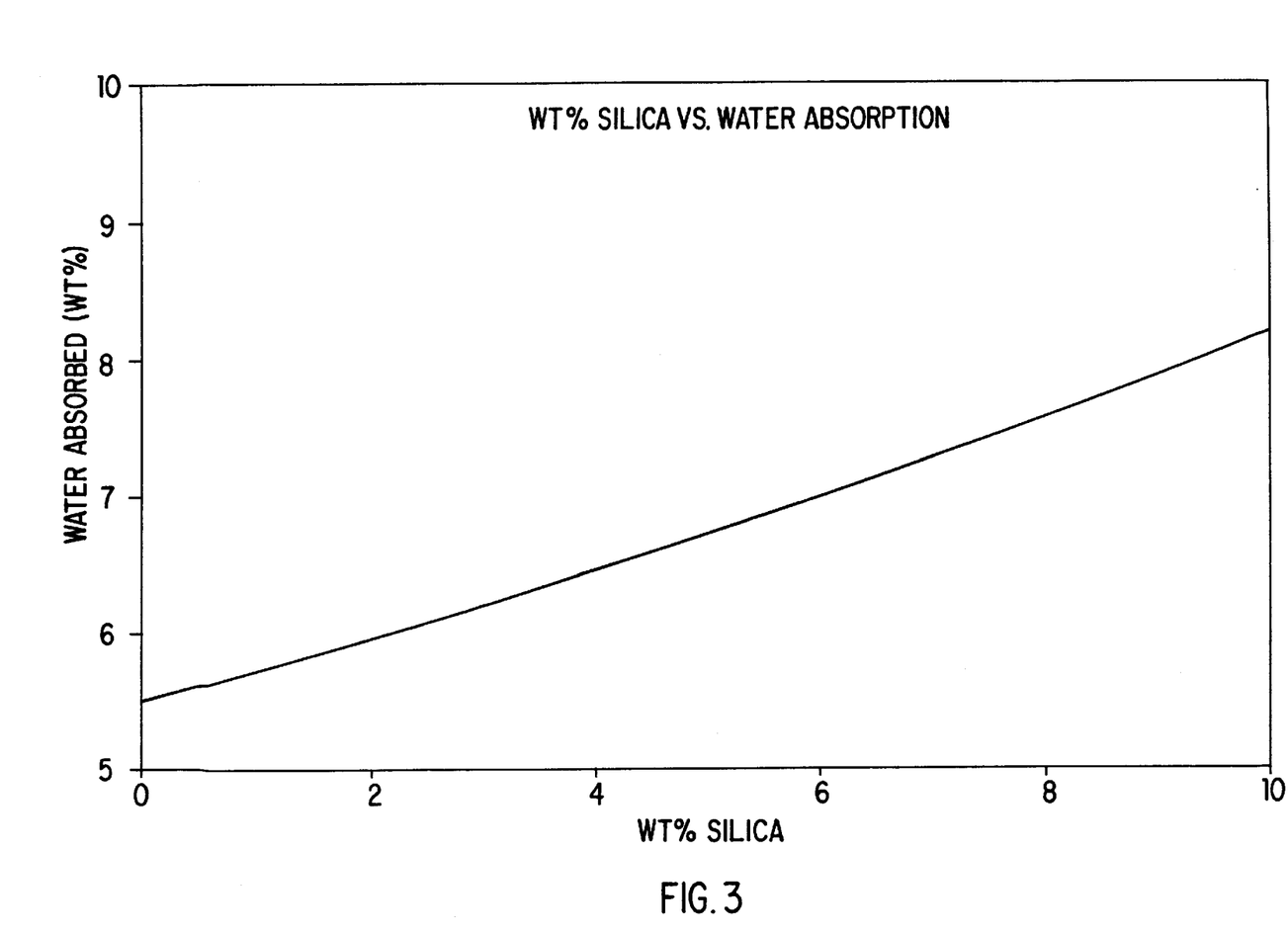
FIG. 3 is a graphical representation of the relationship between the percent of silica in the separator plate and the water absorbed by the separator plate.

The separator plate of this invention also comprises greater than about 5% of a resin. The resin functions as a binder for the molded separator plate and, as previously discussed, may also enhance the hydrophilicity of the plate. Suitable resins include thermosetting resins, thermoplastic resins, and mixtures thereof. Suitable thermoplastic resins for use in the separator plate of this invention include polyvinylidene fluorides, polycarbonates, nylons, polytetrafluoroethylenes, polyurethenes, polyesters, polypropylenes, and HDPE. Preferred thermosetting resins are selected from the group consisting of phenolic resin, aldehydes, epoxies, and vinyls. The following examples are presented to show the relationship between various compositions of the separator plate of this invention and the properties of the separator plate resulting therefrom. In each case, porous 4 by 4 inch separator plates were molded from various mixtures of Varcum 2933 8 phenolic resin having a particle size of less than 200 mesh obtained from Occidental Chemical Corporation of Dallas, Tex., 40 nanometer-size silica particles, carbon fibers having a length of about 150 microns, and graphite powder having less than a 200 mesh particle size. The powders were thoroughly mixed and molded into a plate at 1,000 psi and 400° F. Examples I through IV show the effect of silica as a wetting agent on the conductivity and hydrophilicity of the separator plates at room temperature. Conductivity and hydrophilicity as a function of silica content are also shown in FIGS. 2 and 3, respectively. Example V shows the properties of a separator plate in accordance with one embodiment of this invention having 10 weight percent graphite replaced with carbon fibers. Based upon the results of Examples I through IV, it can be seen that as silica is added to the composition, the hydrophilicity of the plates, as indicated by the amount of water absorption, increases while the electrical conductivity of the plate decreases. However, by substituting up to 10 weight percent carbon fibers for a portion of the electronically conductive graphite material utilized in the composition, the porosity of the plate is increased, the amount of wetting agent (silica) required to achieve a substantial water absorption (18%) is reduced and the conductivity of the plate at the reduced level of silica is maintained over a plate having a corresponding amount of silica and no carbon fiber (Example II).

EXAMPLE I

A plate was molded at 1000 psi and 400° F. with the following composition and properties:

| Composition | Type | Weight Percent |
| --- | --- | --- |
| Resin | Vacuum 29338 | 12.5 |
| Silica | *Aerosil OX-50 | 0.0 |
| Graphite | **HPS-75 | 87.5 |
| Properties | | |
| Conductivity (S/cm) | | 130 |
| Water Absorbed (% Wt Gain) | | 5.6 |

*Degussa Corp. of Richfield Park, New York
**Dixon-Ticonderoga Company of Lake Hurst, New Jersey

EXAMPLE II

A plate was molded at 1000 psi and 400° F. with the following composition and properties:

| Composition | Type | Weight Percent |
| --- | --- | --- |
| Resin | Varcum 29338 | 12.5 |
| Silica | Aerosil OX-50 | 2.5 |
| Graphite | HPS-75 | 85.0 |
| Properties | | |
| Conductivity (S/cm) | | 90 |
| Water Absorbed (% Wt Gain) | | 5.9 |

EXAMPLE III

A plate was molded at 1000 psi and 400° F. with the following composition and properties:

| Composition | Type | Weight Percent |
| --- | --- | --- |
| Resin | Varcum 29338 | 12.5 |
| Silica | Aerosil OX-50 | 5.0 |
| Graphite | HPS-75 | 82.5 |
| Properties | | |
| Conductivity (S/cm) | | 74 |
| Water Absorbed (% Wt Gain) | | 6.7 |

EXAMPLE IV

A plate was molded at 1000 psi and 400° F. with the following composition and properties:

| Composition | Type | Weight Percent |
| --- | --- | --- |
| Resin | Varcum 29338 | 12.5 |
| Silica | Aerosil OX-50 | 10.0 |
| Graphite | HPS-75 | 77.5 |

| Properties | |
| --- | --- |
| Conductivity (S/cm) | 53 |
| Water Absorbed (% Wt Gain) | 8.2 |

EXAMPLE V

A plate was molded at 1000 psi and 400° F. with the following composition and properties:

| Composition | Type | Weight Percent |
| --- | --- | --- |
| Resin | Varcum 29338 | 12.5 |
| Silica | Aerosil OX-50 | 2.5 |
| Graphite | HPS-75 | 75.0 |
| Carbon Fiber | *Panex 30 | 10.0 |

| Properties | |
| --- | --- |
| Conductivity (S/cm) | 95 |
| Water Absorbed (% Wt Gain) | 18 |
| Median Pore Size (MPS) | 0.5µ |

*Zoltek Corporation of St. Louis, Missouri

Resiliency is the capability of a strained body to recover its size and shape after deformation caused by, for example, compressive stress. The resiliency of graphite utilized in the separator plate of this invention is about 26%. That is, after undergoing compressive stress, the graphite expands to about 126% of its compressed shape and form. In contrast thereto, carbon fiber has a significantly higher resiliency. A separator plate having higher resiliency due to the resiliency of the individual components comprising the separator plate is undesirable in that it limits the pore sizes which can be achieved. In particular, the use of materials having higher resiliencies results in a plate having larger pore sizes whereas the use of materials having low resiliencies results in a plate having smaller pore sizes. Larger pore sizes generally reduce the pressure required for reactant gases to pass from one side of the separator plate to the other and result in a reduction in conductivity of the plate. Plates using low resiliency materials are generally stronger and more conductive. Surprisingly, we have found that a mixture of graphite and carbon fiber as used in Example V resulted in a plate having a resiliency corresponding to the resiliency of graphite alone. This is surprising in that one skilled in the art would expect that the addition of carbon fiber, which has a substantially higher resiliency than graphite, would result in a plate having significantly higher resiliency. Thus, in accordance with a particularly preferred embodiment of this invention, the amount of carbon fiber present in the separator plate of this invention is less than about 10% by weight.

The bubble pressure of a separator plate relates to its ability to prevent the crossover of reactant gases from one side of the separator plate to the other. The bubble pressure is the positive pressure of the water in a pore of the separator plate, which is inversely proportional to the pore sizes in the plate. That is, the smaller the median pore size, the greater the pressure exerted by the water absorbed in the plate. The bubble pressure is, thus, the pressure above which the reactant gases will be forced through the water saturated plate, resulting in undesirable mixing of the two reactants as well as entry of the reactant gases into the coolant water passages of the separator plate. We have found that separator plates of this invention have a bubble pressure greater than 5 psig. Preferred embodiments of the separator plate of this invention have bubble pressures greater than 10 psig, and more preferably, greater than 20 psig.

Figure 1A:
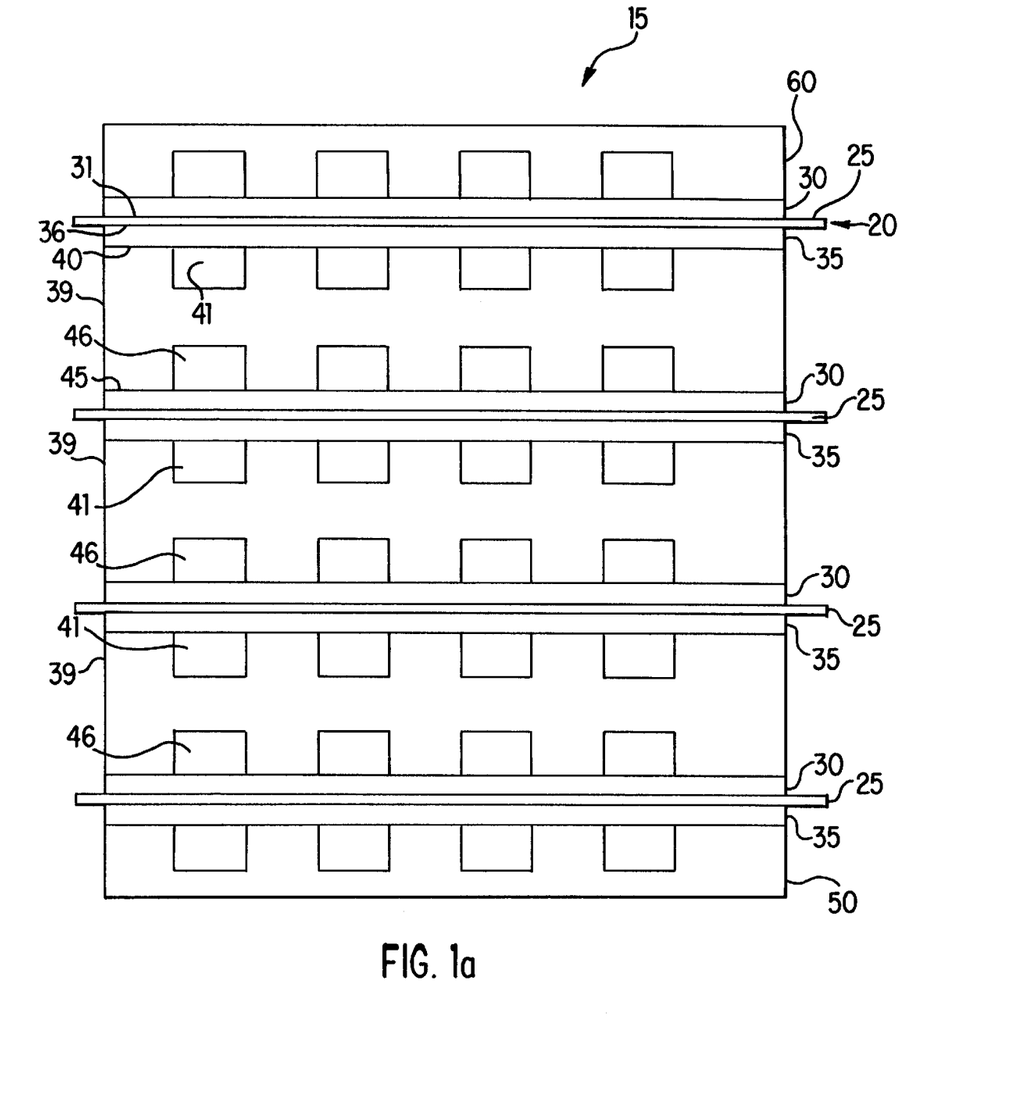
FIG. 1a is a side view of a PEM fuel cell stack with one-piece separator plates in accordance with one embodiment of this invention.
Figure 1B:
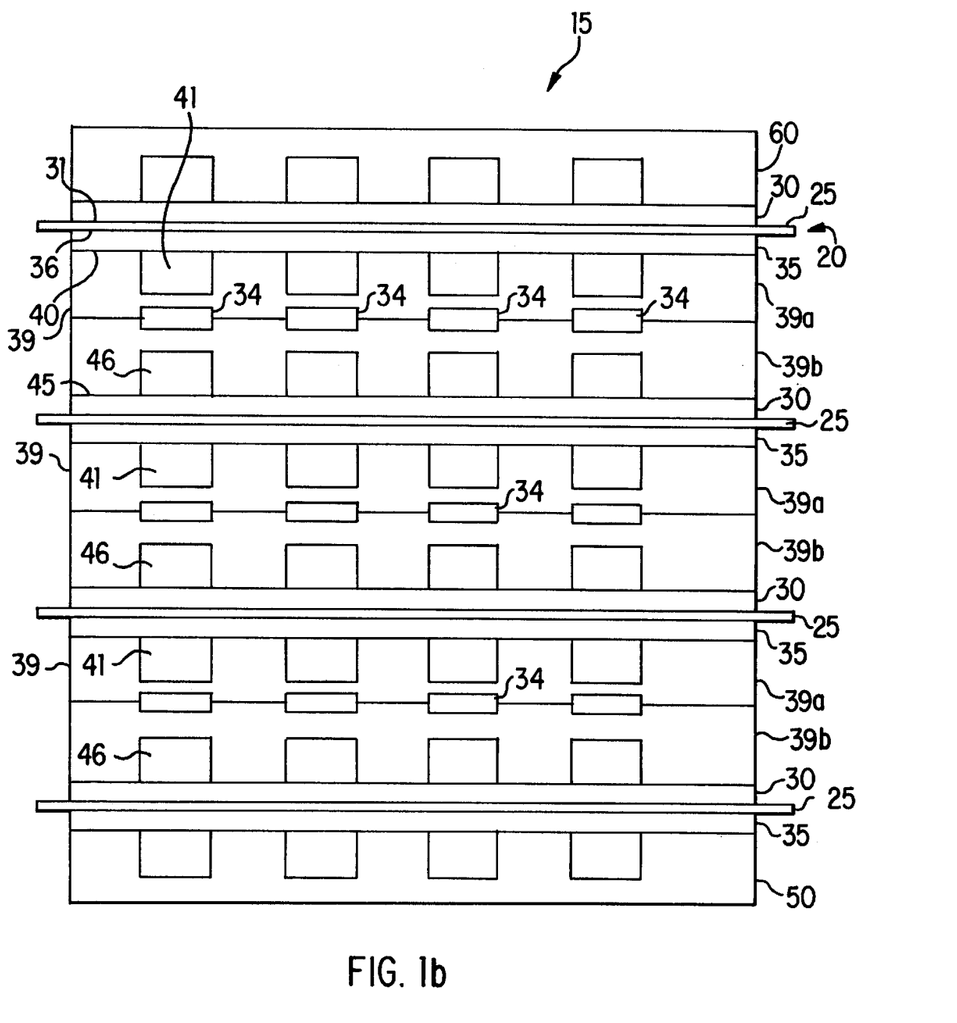
FIG. 1b is a side view of a PEM fuel cell stack with two-piece separator plates in accordance with one embodiment of this invention.

FIGS. 1a and 1b show a fuel cell stack 15 having a plurality of fuel cell units 20, each said fuel cell unit comprising a proton exchange membrane 25, an anode electrode 30 on one side and a cathode electrode 35 on the other side. Disposed between anode electrode 30 and membrane 25 is an anode catalyst layer 31 and disposed between cathode electrode 35 and membrane 25 is a suitable cathode catalyst layer 36. Separating anode electrode 30 of one fuel cell unit from cathode electrode 35 of an adjacent fuel cell unit is bi-polar separator plate 39.

In accordance with one embodiment of this invention as shown in FIG. 1a, the separator plate 39 of this invention is a one-piece separator plate comprising a cathode facing face 40 and an anode facing face 45, the cathode facing face 40 forming a plurality of oxidant gas flow channels 41 extending therethrough so as to provide contact between the oxidant in the cathode channels with the cathode electrode 35. Similarly, the anode facing face 45 forms suitable fuel gas flow channels 46 formed therein so as to provide contact between the fuel gas and the anode electrode 30.

In accordance with another embodiment of this invention as shown in FIG. 1b, separator plate 39 is constructed of two plates, cathode facing plate 39a and anode facing plate 39b. To provide for water cooling of the stack, the interfaces of cathode facing plate 39a and anode facing plate 39b form a plurality of cooling water channels 34.

The fuel cell stack further includes a cathode separator end plate 50 and an anode separator end plate 60. The end plates 50 and 60 are impermeable to water or are otherwise sealed to prevent leakage. Suitable tensioning mechanisms and gaskets (not shown) are provided for securing the components of the stack together.

In this regard, the separator plate of this invention must be sufficiently strong to withstand crushing under the forces applied thereto during assembly of the fuel cell stack. The crush strength of the separator plate must be greater than 200 psi. The separator plate produced in accordance with Example 5 had a crush strength greater than 2,100 psi. In addition to crush strength, the separator plate of this invention must have a certain degree of flexibility to allow it to conform to the other components of the fuel cell stack assembly. In accordance with a particularly preferred embodiment of this invention, the separator plate has a minimum flexibility of 3.5%, or about 0.43 inches per linear foot, without breaking.

As previously discussed, carbon fibers may be added to the separator plates of this invention and are preferably substantially uniformly distributed throughout the plate in an amount up to about 20% by weight of the separator plate, but most preferably less than 10% by weight of the separator plate. Because carbon fibers are expensive, their use is optional, but advantageous, because they provide porosity and structural reinforcement without sacrificing as much conductivity as using a corresponding amount of wetting agent.

As can be seen from the examples, there is a balance which must be achieved in the composition of the separator plate to provide a plate having the desired conductivity and hydrophilicity. The examples show that as the amount of wetting agent in the form of $SiO_2$ is increased in order to increase hydrophilicity, the conductivity of the plate is reduced. FIG. 3 shows the increase in the amount of water absorbed into the plate with increasing $SiO_2$ content while FIG. 2 shows decreasing conductivity with an increase in $SiO_2$ content. The data points cross at a silica content of about 5% by weight. Accordingly, the preferred range of silica utilized in the separator plate of this invention is in the range of about 1% to 10% by weight, and most preferably in the range of about 2% to 4% by weight. The addition of carbon fibers, as previously discussed, up to 20% by weight, provides additional porosity without loss of conductivity. However, carbon fibers are expensive and, thus, minimizing the amount used is desirable.

Figure 4:
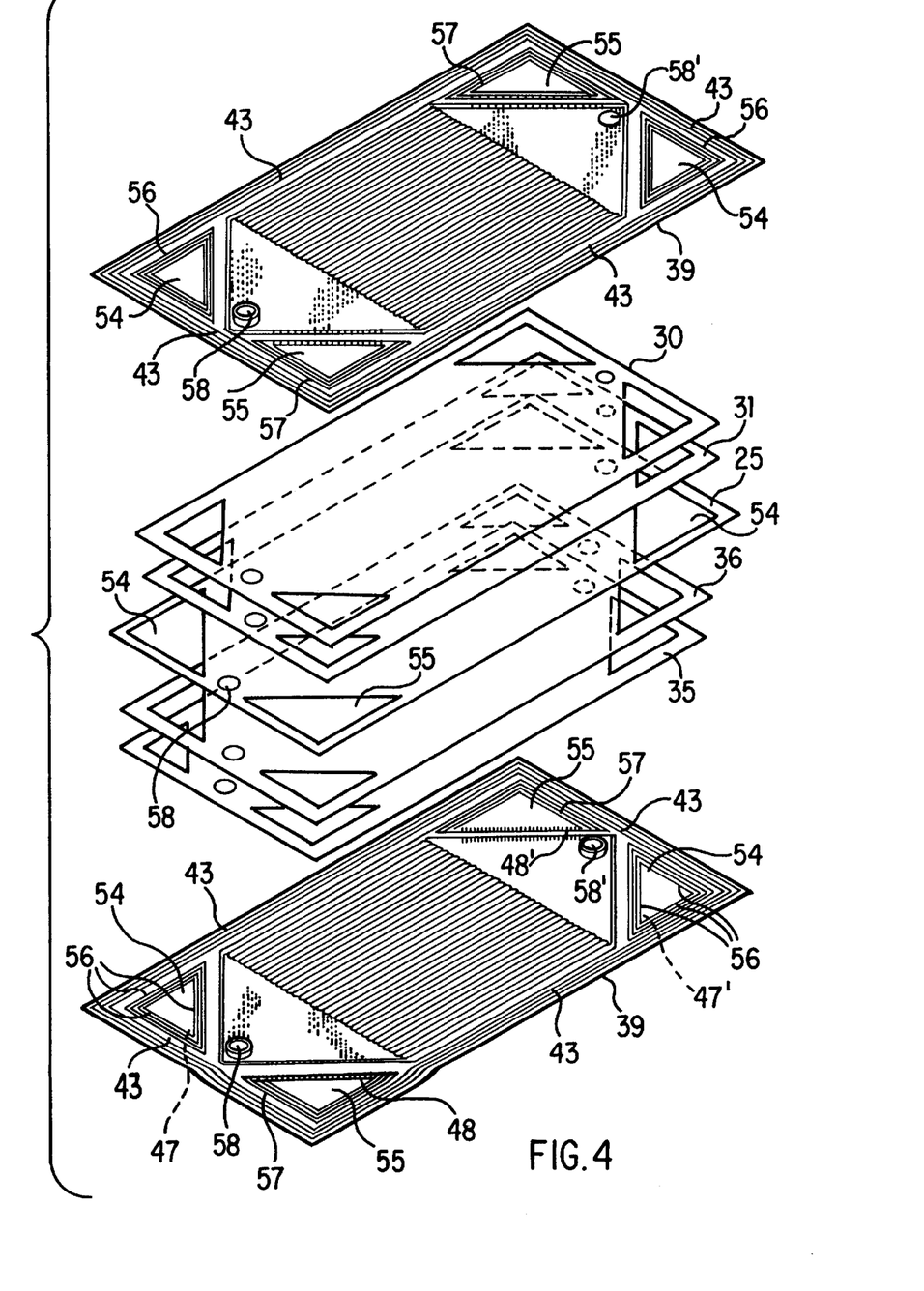
FIG. 4 is a diagram showing an internally manifolded configuration of a fuel cell stack.

The separator plate of this invention is suitable for use in either an externally manifolded fuel cell stack or an internally manifolded fuel cell stack. In an externally manifolded fuel cell stack, reactant gases are provided from external manifolds connected to the edge regions of the fuel cell stack, whereas, in an internally manifolded fuel cell stack, the reactant gases are provided through manifolds formed by perforations in the cell components to the reaction sites. An internally manifolded fuel cell stack utilizing a bi-polar separator plate in accordance with one embodiment of this invention is shown in FIG. 4. As shown in FIG. 4, the ion exchange membranes 25 and separator plates 39 of the fuel cell stack extend to the peripheral edge of the stack. The separator plates 39 are provided with flattened peripheral seal structures 43 extending from each face to contact the ion exchange membranes completely around their periphery, thereby forming a peripheral seal. The ion exchange membranes and the separator plates each form a plurality of fuel manifold holes 54, one for supply and one for removal, and a plurality of oxidant manifold holes 55, one for supply and one for removal. The manifold holes 54, 55 in the separator plates are surrounded by a flattened manifold seal structure 56, 57 extending from each face of the separator plate to contact the ion exchange membrane, thereby forming a manifold seal and, thus, forming a plurality of fuel and oxidant gas manifolds which extend through the cell stack. Conduits 47, 47' are provided through the flattened manifold seal structures surrounding fuel manifold holes 54 on the anode facing face of the separator plate so as to provide fuel gas communication between one set of manifolds and the anode gas reactant regions formed between the anodes and the anode facing faces of the separator plates and conduits 48, 48' are provided through the flattened manifold seal structure surrounding oxidant manifold holes 55 on the cathode facing face of the separator plate providing oxidant gas communication between a second set of manifolds and cathode reaction regions formed between the cathodes and the cathode facing faces of the separator plates, thereby providing fully internal manifolding of fuel and oxidant gases to and from each said fuel cell unit in the fuel cell stack.

Bi-polar separator plates in accordance with this invention are produced by mixing at least one electronically conductive, preferably carbonaceous, material, at least one resin and at least one hydrophilic agent so as to form a substantially homogeneous mixture comprising in a range of about 50% to 95% by weight of said electronically conductive material, at least about 5% by weight of said resin and said hydrophilic agent. The mixture is then molded into a desired shape at a temperature in a range of about 250° F. to about 800° F. at a pressure in a range of about 500 psi to about 4,000 psi, thereby forming a bi-polar plate.

In accordance with one embodiment of this invention, the PEM fuel cell stack, and thus the separator plate of this invention comprises water supply and removal means for circulation and removal of cooling water from within said fuel cell stack. As shown in FIG. 1b, separator plate 39 comprising cathode facing plate 39a and anode facing plate 39b form a plurality of cooling water channels 34 at their interface. In an internal manifolded fuel cell stack as shown in FIG. 4, water is provided from water manifold holes 58 which are provided with extended manifold seal structures for sealing against adjacent cell components and which form conduits for communication between said water manifold holes 58 and said cooling water channels 34 and water is removed through water manifold holes 58'.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A gas impervious bi-polar separator plate for a proton exchange membrane fuel cell comprising:
    at least one electronically conductive material in an amount in a range of about 50% to about 95% by weight of said separator plate;
    at least one resin in an amount of at least about 5% by weight of said separator plate; and
    at least one hydrophilic agent suitable for use in a proton exchange membrane fuel cell for attracting water into said separator plate, whereby said at least one electronically conductive material, said at least one resin, and said at least one hydrophilic agent are substantially uniformly dispersed throughout said separator plate.

2. A bi-polar separator plate in accordance with claim 1, wherein said at least one resin is hydrophilic.

3. A bi-polar separator plate in accordance with claim 1, wherein said at least one electronically conductive material is selected from the group consisting of carbonaceous materials, metals, metal alloys, metal carbides, metal nitrides, and mixtures thereof.

4. A bi-polar separator plate in accordance with claim 1 wherein said at least one electronically conductive material comprises at least one carbonaceous material.

5. A bi-polar separator plate in accordance with claim 1, wherein said hydrophilic agent is a wetting agent.

6. A bi-polar separator plate in accordance with claim 1 further comprising carbon fibers up to about 45% by weight of said separator plate substantially uniformly dispersed throughout said separator plate.

7. A bi-polar separator plate in accordance with claim 5, wherein said wetting agent is selected from the group consisting of oxides of Ti, Al, Si, and mixtures thereof.

8. A bi-polar separator plate in accordance with claim 1, wherein said at least one resin is selected from the group consisting of thermosetting resins, thermoplastic resins, and mixtures thereof.

9. A bi-polar separator plate in accordance with claim 1, wherein said at least one electronically conductive material is selected from the group consisting of graphite, carbon black, carbon fibers, and mixtures thereof.

10. A bi-polar separator plate in accordance with claim 1, wherein said plate is porous.

11. A bi-polar separator plate in accordance with claim 10, wherein the porosity of said plate is less than about 25% by volume of said plate.

12. A bi-polar separator plate in accordance with claim 10, wherein the median diameter of said pores is in a range of about 0.25 microns to about 2.0 microns.

13. A bi-polar separator plate in accordance with claim 10, wherein a bubble pressure of said plate is greater than about 5 psig.

14. A bi-polar separator plate in accordance with claim 1, wherein an electrical conductivity of said plate is at least about 5 S/cm.

15. A bi-polar separator plate in accordance with claim 1 comprising in a range of about 70% to 90% by weight of said electronically conductive material, in a range of about 8% to 15% by weight of a thermosetting said resin, about 0 to 10% by weight carbon fibers, and about 0.01% to 5.0% by weight silica.

16. A bi-polar separator plate in accordance with claim 1 further comprising means for circulating water through said separator plate between an anode facing surface and a cathode facing surface of said separator plate.

17. In a bi-polar separator plate comprising an electronically conductive carbonaceous material in a range of about 50% to about 95% by weight of said separator plate and a resin in an amount in a range of at least about 5% by weight of said separator plate, the improvement comprising:

said bi-polar separator plate comprising a hydrophilic agent suitable for use in a proton exchange membrane fuel cell, which hydrophilic agent is dispersed uniformly throughout said separator plate whereby water is capable of being absorbed into and passed through said separator plate.

18. A bi-polar separator plate in accordance with claim 17, wherein said hydrophilic agent is a hydrophilic said resin.

19. A bi-polar separator plate in accordance with claim 17, wherein said hydrophilic agent is a wetting agent.

20. A bi-polar separator plate in accordance with claim 17 further comprising carbon fibers up to about 45% by weight of said separator plate substantially uniformly dispersed throughout said separator plate.

21. A bi-polar separator plate in accordance with claim 19, wherein said wetting agent is selected from the group consisting of oxides of Ti, Al, Si, and mixtures thereof.

22. A bi-polar separator plate in accordance with claim 17, wherein said at least one resin is selected from the group consisting of thermosetting resins, thermoplastic resins, and mixtures thereof.

23. A bi-polar separator plate in accordance with claim 17, wherein said at least one electronically conductive carbonaceous material is selected from the group consisting of graphite, carbon black, carbon fibers, and mixtures thereof.

24. A bi-polar separator plate in accordance with claim 17, wherein said plate is porous.

25. A bi-polar separator plate in accordance with claim 24, wherein the porosity of said plate is less than about 25% by volume of said plate.

26. A bi-polar separator plate in accordance with claim 24, wherein the median diameter of said pores is in a range of about 0.25 microns to about 2.0 microns.

27. A bi-polar separator plate in accordance with claim 24, wherein a bubble pressure of said plate is greater than about 5 psig.

28. A bi-polar separator plate in accordance with claim 17, wherein an electrical conductivity of said plate is at least about 5 S/cm.

29. A bi-polar separator plate in accordance with claim 17, wherein a center region of said separator plate forms a flow guidance means for distribution of fuel cell gases.

30. A bi-polar separator plate in accordance with claim 29, wherein a crush strength of said center region is greater than about 200 psi.

31. In a proton exchange membrane fuel cell stack comprising a plurality of individual fuel cell units, each said fuel cell unit comprising an anode, a cathode, an ion exchange membrane disposed between said anode and said cathode, and a separator plate having an anode facing face and a cathode facing face, said separator plate separating said fuel cell units between an anode of one said fuel cell unit and a cathode of an adjacent said fuel cell unit, the improvement comprising:

said separator plate comprising at least one electronically conductive carbonaceous material in an amount in a range of about 50% to about 95% by weight of said separator plate, at least one resin in an amount of at least about 5% by weight of said separator plate, and at least one hydrophilic agent suitable for use in a proton exchange membrane fuel cell for attracting water into said separator plate, whereby said at least one electronically conductive carbonaceous material, said at least one resin, and said at least one hydrophilic agent are substantially uniformly dispersed throughout said separator plate.

32. A fuel cell stack in accordance with claim 31, wherein said at least one resin is hydrophilic.

33. A fuel cell stack in accordance with claim 31, wherein said hydrophilic agent is a wetting agent.

34. A fuel cell stack in accordance with claim 31, wherein said separator plate further comprises carbon fibers up to about 45% by weight of said separator plate substantially uniformly dispersed throughout said separator plate.

35. A fuel cell stack in accordance with claim 33, wherein said wetting agent is selected from the group consisting of oxides of Ti, Al, Si, and mixtures thereof.

36. A fuel cell stack in accordance with claim 31, wherein said at least one resin is selected from the group consisting of thermosetting resins, thermoplastic resins, and mixtures thereof.

37. A fuel cell stack in accordance with claim 31, wherein said at least one electronically conductive carbonaceous material is selected from the group consisting of graphite, carbon black, carbon fibers, and mixtures thereof.

38. A fuel cell stack in accordance with claim 31, wherein said plate is porous.

39. A fuel cell stack in accordance with claim 38, wherein the porosity of said plate is less than about 25% by volume of said plate.

40. A fuel cell stack in accordance with claim 38, wherein the median diameter of said pores is in a range of about 0.25 microns to about 2.0 microns.

41. A fuel cell stack in accordance with claim 38, wherein a bubble pressure of said plate is greater than about 5 psig.

42. A fuel cell stack in accordance with claim 31, wherein an electrical conductivity of said plate is at least about 5 S/cm.

43. A fuel cell stack in accordance with claim 31, wherein said ion exchange membranes and said separator plates extend to a peripheral edge of said fuel cell stack, said separator plates have a flattened peripheral seal structure extending from each face to contact said ion exchange membranes completely around their periphery, forming a peripheral seal, said ion exchange membranes and said separator plates each having a plurality of aligned perforations, said perforations in said separator plates being surrounded by a flattened manifold seal structure extending from each said face to contact said ion exchange membrane, forming a manifold seal, thereby forming a plurality of gas manifolds extending through said cell stack, and conduits through said flattened manifold seal structure providing fuel gas communication between one set of said manifolds and anode chambers formed between said anodes and said anode facing faces of said separator plates and conduits through said flattened manifold seal structure providing oxidant gas communication between a second set of said manifolds and cathode chambers formed between said cathodes and said cathode facing faces of said separator plates, thereby providing fully internal manifolding of fuel and oxidant gases to and from each said fuel cell unit in said fuel cell stack.

44. A fuel cell stack in accordance with claim 31, wherein a center region of said separator plate forms a flow guidance means for distribution of fuel cell gases within each fuel cell unit.

45. A fuel cell stack in accordance with claim 31 further comprising water circulation means for circulating and removing water from said fuel cell stack.

46. A method for producing a bi-polar separator plate comprising:

mixing at least one electronically conductive material, at least one resin and at least one hydrophilic agent suitable for use in a proton exchange membrane fuel cell, forming a substantially homogeneous mixture comprising said at least one electronically conductive material in an amount in a range of about 50% to about 95% by weight of said mixture, said at least one resin in an amount of at least about 5% by weight of said mixture, and said at least one hydrophilic agent; and molding said mixture into a desired shape at a temperature in a range of about 250° F. and about 500° F. and a pressure in a range of about 500 psi and about 4000 psi, forming a bi-polar plate.

47. A method in accordance with claim 46, wherein said plate has a porosity less than about 25% of a volume of said plate.

48. A method in accordance with claim 47, wherein said plate forms a plurality of pores having a median pore size in a range of about 0.25 microns to about 2.0 microns.

49. A method in accordance with claim 46, wherein said at least one resin is hydrophilic.

50. A method in accordance with claim 46, wherein said hydrophilic agent is a wetting agent.

51. A method in accordance with claim 46, wherein said at least one electronically conductive material is a carbonaceous material.

52. A method in accordance with claim 46 further comprising mixing carbon fibers in an amount up to about 45% by weight of said mixture into said mixture.

53. A method in accordance with claim 50, wherein said wetting agent is selected from the group consisting of oxides of Ti, Al, Si, and mixtures thereof.

54. A method in accordance with claim 46, wherein said at least one resin is selected from the group consisting of thermosetting resins, thermoplastic resins, and mixtures thereof.

55. A method in accordance with claim 51, wherein said at least one electronically conductive carbonaceous material is selected from the group consisting of graphite, carbon black, carbon fibers, and mixtures thereof.

* * * * *